United States Patent

Kawasumi

[11] Patent Number: 4,561,175
[45] Date of Patent: Dec. 31, 1985

[54] METHOD OF WINDING A SUPERCONDUCTING COIL

[75] Inventor: Yoichi Kawasumi, Kobe, Japan

[73] Assignee: Mitsubishi Denki Kabushiki Kaisha, Tokyo, Japan

[21] Appl. No.: 534,112

[22] Filed: Sep. 20, 1983

[30] Foreign Application Priority Data

Nov. 30, 1982 [JP] Japan ................... 57-211618

[51] Int. Cl.$^4$ .................. H01F 7/06; H01L 39/24
[52] U.S. Cl. ........................... 29/605; 29/599; 242/7.08; 174/126 S
[58] Field of Search .......... 29/518, 871, 872, 599, 29/605; 174/84 C, 15 C, 15 S, 128 S, 126 S; 242/708

[56] References Cited

U.S. PATENT DOCUMENTS 3,214,249 10/1965 Bean et al. ............... 29/599 UX
4,261,097 4/1981 Weisse ...................... 29/599

FOREIGN PATENT DOCUMENTS 54-32094 3/1979 Japan.
55-160406 12/1980 Japan.
56-12712 2/1981 Japan.

Primary Examiner—Howard N. Goldberg
Assistant Examiner—Vernon K. Rising
Attorney, Agent, or Firm—Leydig, Voit & Mayer

[57] ABSTRACT

Described is a method for winding a superconducting coil in a plurality of layers in a winding frame or bobbin, with a filler material placed between adjacent layers of the coil, wherein use is made of a silicon compound solidifying at ambient temperature as a filler material for fastening the conductor elements together and adjusting the interspaces between adjoining conductor elements in each layer of the coil.

3 Claims, 3 Drawing Figures

METHOD OF WINDING A SUPERCONDUCTING COIL

BACKGROUND OF THE INVENTION

This invention relates to a method of winding a superconducting coil.

FIG. 1 shows a conventional device utilized in winding a superconducting coil. In this figure, numeral 1 designates a winding frame or bobbin for a superconducting coil and numeral 2 an insulation layer of the winding frame 1 which is grounded. Numeral 3a, 3b and 3n designate a first second and n'th layers, respectively, of an n layer superconducting coil 3. Numeral 4 designates a filler for filling up the interspaces between adjoining conductors of the coil 3, such as epoxy resin or glass fibers.

With such a superconducting coil, unless the conductor elements are firmly secured in place, heat due to friction may be generated between adjacent conductor elements due to relative physical displacement therebetween, thus causing a quenching phenomenon resulting in the destruction of the coils superconductive property. In order to overcome this deficiency, various methods have been proposed for firmly securing the superconducting coil 3, as shown by way of an example in FIG. 1.

During manufacture of the coil 3 shown in FIG. 1, the winding pitch or the distance between adjacent layer's of the coil is adjusted by glass fibers placed in the spaces therebetween, wherein; the first layer 3a of the coil is placed and secured in position. Next, the second layer 3b of the coil is placed in position. If the interspace between given layers varies as shown in FIG. 2 by a dimentional gap δn along the conductors of the respective layers, the gap δn is filled with glass fibers in the same manner as for the gap between the conductors. The winding of the coil 3 is continued in this manner up to the last layer 3n. A vacuum pressuring and impregnating system using an epoxy resin as a filler is resorted to for securing the conductors with a predetermined gap in the winding bobbin 1.

With the above construction, fine adjustment of the relative position of the individual conductors is required by the use of glass fibers. In addition, a vacuum pressing and impregnating treatment with the aid of epoxy resin is required as an ultimate treatment, thus necessitating a great deal of labor and a large-size vacuum pressurizing and impregnating device.

SUMMARY OF THE INVENTION

It is an object of the present invention to obviate the aforementioned deficiency of the prior art method and provide a winding method for the superconducting coil according to which the winding operation may be completed in a shorter time through the use of a cold solidifying silicon rubber compound as the filler and spacer for the coil conductors to provide for a sufficient bonding strength among the coil conductors without requiring the use of vacuum pressurizing and impregnating devices.

According to the present invention, the first layer conductors of the coil are placed in the winding bobbin with laminated epoxy glass sheets placed between adjoining conductors. A silicon rubber compound is filled into the gaps between adjoining conductors and semi-dried with a hand drier. The epoxy glass spacers are then removed and the silicon rubber filler is further injected into the spaces formerly occupied by the rubber compound, while the gap δn is adjusted for simultaneously. The second, third and so on layers of the coil 3 are positioned in the same manner as described for the first layer conductors 3a, the step of vacuum pressurizing and impregnating being thus eliminated.

DETAILED DESCRIPTION OF THE PREFERRED EMBODIMENT

Figure 3:
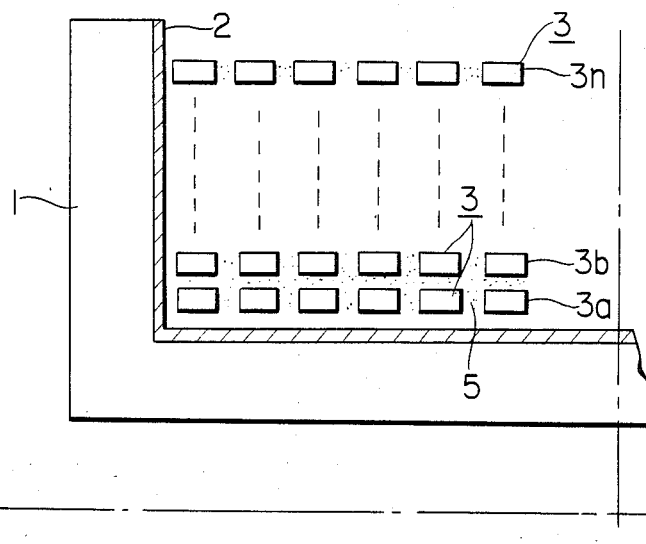

A preferred embodiment of the present invention is now described by referring to the accompanying drawing. In FIG. 3, numerals 1, 2, 3, 3a, 3b, . . . , 3n designate the same parts as those shown in FIG. 3. Numeral 5 designates a silicon rubber compound to be used in place of the conventional filler 4, that is, epoxy resin and glass fibers. A one liquid type RTV rubber KE-45-W which is manufactured by Shinetsu Silicon Co., Ltd. may be used as the silicon rubber compound.

Figure 1:
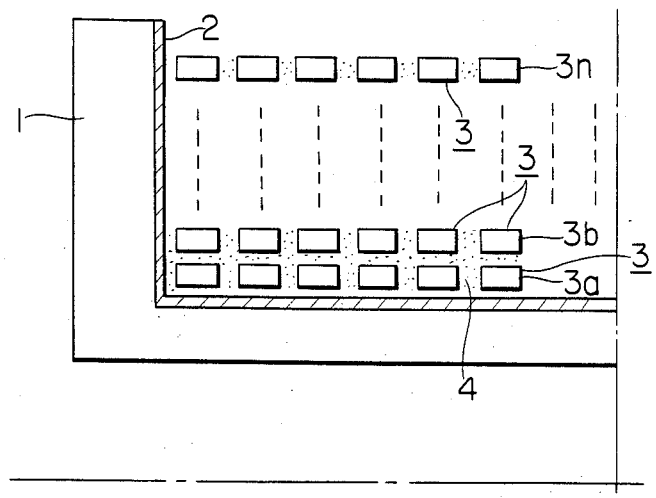
FIG. 1 is a sectional view showing the superconducting coil wound in a bobbin through the use of a conventional winding method.
Figure 2:
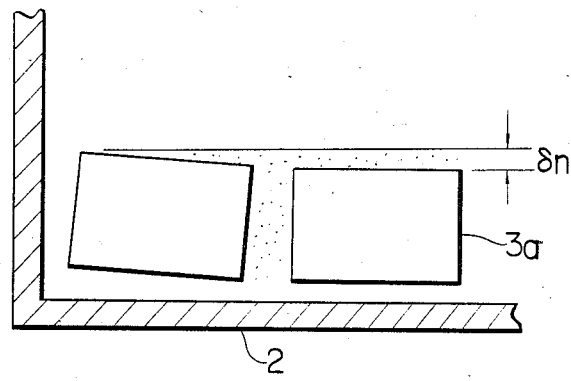
FIGS. 2 and 3 are views of a superconducting coil wound in a bobbin through the use of the winding method of the present invention.

The superconducting coil may be wound as follows: When placing the first layer 3a of the coil 3, laminated epoxy glass sheets are placed concentrically as spacers between respective conductors. The first layer 3a is continuously wound up to the last conductor of said layer. The aforementioned silicon rubber compound is filled into the interspaces between adjoining conductors. The compound thus applied is dried with a hand drier to promote curing. When the compound is in a semi-dried state, the epoxy glass plates which were placed between the adjacent conductors are removed. Next, the silicon rubber compound is filled into the interspaces formerly occupied by the epoxy glass plates, while the difference in height δn FIG. 2 is compensated for. Again, the hand drier is used for curing the applied compound. Before placing the second layer 3b of the coil 3, a thin layer of the silicon rubber compound is applied on the conductors of the first layer 3a. The second to the n'th layer are formed similarly to the first layer 3a. In this manner, the superconducting coil making use of the silicon rubber compound as a filler is completed. Accordingly, the vacuum pressurizing and impregnating treatment required in the conventional practice is thereby dispensed with.

When placed in liquid helium, the silicon rubber compound becomes so hard as epoxy resin, while its bonding properties to the conductors of the coil 3 remain unchanged, although it is rubber-like and low in elasticity at ambient temperature. Thus the silicon rubber compound may be safely used with liquid helium as a substitute for epoxy resin. In addition, the silicon rubber compound is invulnerable to heat shock and has the properties of natural rubber. Results of temperature cycle tests conducted between the liquid helium temperature and ambient temperature has indicated that the silicon rubber compound shows a better characteristics than the epoxy resin.

It should be noted that the silicon rubber compound RTV-KE-45-W may be replaced by a rubber-like compound which solidifies at ambient temperature as a filler in the above embodiment.

From the foregoing, it is seen that the arrangement of the present invention consisting in making use of a solidifying silicon rubber compound under cold temperatures as a filler between adjoining conductors of a superconducting coil eliminates the vacuum pressurizing and impregnating device, while reducing the time usually required in performing the winding operation of the coil, thus making it possible to produce superconducting coils with high accuracy and at a reduced cost.

What is claimed is:

1. A method of winding a superconductive coil comprising the steps of winding the superconductive coil on a bobbin in a plurality of layers using a first filler between the conductors of each layer, and replacing the first filler with a normally temperature setting silicon compound second filler as a regulating and fixing means between the conductors of said coil.

2. The method as claimed in claim 1 wherein said method comprises the steps of setting a first filler comprising a specified set of glass epoxy laminated plates between the conductors of each layer in a circumferential direction, filling the silicon compound second filler between the conductors, removing the first filler comprising the glass epoxy laminated plates when the silicon compound is in a semicured state and filling silicon compound second filler in the regions from which the first filler has been removed.

3. The method as claimed in claim 2 wherein said silicon compound is in the rubber-like state at ambient temperature.

* * * * *